US009788650B2

(12) United States Patent
Tsai

(10) Patent No.: US 9,788,650 B2
(45) Date of Patent: Oct. 17, 2017

(54) FOLDABLE POST FOR SHELVING APPARATUS

(71) Applicant: Frank Tsai, Shenzhen (CN)

(72) Inventor: Frank Tsai, Shenzhen (CN)

( * ) Notice: Subject to any disclaimer, the term of this patent is extended or adjusted under 35 U.S.C. 154(b) by 0 days.

(21) Appl. No.: 15/004,986

(22) Filed: Jan. 24, 2016

(65) Prior Publication Data
US 2017/0208936 A1    Jul. 27, 2017

(51) Int. Cl.
*A47B 43/00* (2006.01)
*A47B 47/00* (2006.01)
*A47B 57/00* (2006.01)
*A47B 57/50* (2006.01)
*A47B 96/02* (2006.01)
(Continued)

(52) U.S. Cl.
CPC .......... *A47B 47/0083* (2013.01); *A47B 43/00* (2013.01); *A47B 45/00* (2013.01); *A47B 47/00* (2013.01); *A47B 47/021* (2013.01); *A47B 57/50* (2013.01); *A47B 87/02* (2013.01); *A47B 87/0207* (2013.01); *A47B 87/0215* (2013.01); *A47B 96/02* (2013.01); *A47B 96/14* (2013.01); *A47B 96/145* (2013.01); *A47B 96/1458* (2013.01); *A47F 5/10* (2013.01); *A47F 5/101* (2013.01); *A47B 2220/0072* (2013.01)

(58) Field of Classification Search
CPC ..... A47B 47/0083; A47B 96/02; A47B 57/50; A47B 45/00; A47B 43/00; A47B 87/02; A47B 47/00; A47B 47/02; A47B 47/021; A47B 47/045; A47B 47/0091; A47B 47/024; A47B 47/027; A47B 57/06; A47B 57/22; A47B 87/00; A47B 87/005; A47B 87/007; A47B 87/008; A47B 87/0207; A47B 87/0215; A47B 87/0246; A47B 96/14; A47B 96/1408; A47B 96/1416; A47B 96/1433; A47B 96/145; A47B 96/1458; A47B 96/06; A47B 2220/0072; A47F 5/10; A47F 5/13; A47F 3/004; A47F 5/101; A47F 5/103; A47F 5/0081; Y10T 403/32254; Y10T 403/32319; Y10T 403/32393; Y10T 403/32401; Y10T 403/32409

USPC ....... 211/187, 186, 188, 194, 103, 134, 149; 403/83, 91, 100, 101, 102
See application file for complete search history.

(56) References Cited

U.S. PATENT DOCUMENTS 2,226,763 A * 12/1940 Geib ...................... A63H 33/06
                                                    211/194
3,499,398 A *  3/1970 Murray ................ B65D 19/385
                                                    108/53.5
(Continued)

*Primary Examiner* — Jennifer E Novosad
(74) *Attorney, Agent, or Firm* — Raymond Y. Chan; David and Raymond Patent Firm

(57) ABSTRACT

A foldable post for a shelving apparatus includes an upper post member, a lower post member, and a post joint for connecting the upper and lower post members end-to-end. The post joint includes an engaging tongue extended from an end portion of the first post wall of the upper post member, an engaging groove provided at an end portion of the first post wall of the lower post member, and a pivot hinge pivotally coupled the second post walls of the upper and lower post members, such that when the upper and lower post members are pivotally moved to engage the engaging tongue with the engaging groove, to the upper and lower post members are interlocked and coupled with each other end-to-end.

18 Claims, 8 Drawing Sheets

(51) Int. Cl.
*A47B 87/02* (2006.01)
*A47B 47/02* (2006.01)
*A47B 96/14* (2006.01)
*A47B 45/00* (2006.01)
*A47F 5/10* (2006.01)

(56) References Cited

U.S. PATENT DOCUMENTS

| | | | | |
|---|---|---|---|---|
| 3,722,702 | A * | 3/1973 | Marker, Jr. | A47F 5/13 108/115 |
| 3,804,033 | A * | 4/1974 | Izawa | B65D 19/385 108/53.5 |
| 3,946,876 | A * | 3/1976 | Jay | B65D 19/08 108/55.1 |
| 4,141,665 | A * | 2/1979 | Snapp, Jr. | F16C 11/10 297/378.12 |
| 4,258,631 | A * | 3/1981 | Brown | A47B 43/00 108/109 |
| 4,319,792 | A * | 3/1982 | Britt | A47B 67/02 108/107 |
| 4,351,246 | A * | 9/1982 | Hutchins, Jr. | A47B 47/06 108/156 |
| 4,699,067 | A * | 10/1987 | Okopny | A47F 5/10 108/108 |
| 5,228,821 | A * | 7/1993 | Gleffe | B65D 19/12 108/53.1 |
| 5,611,634 | A * | 3/1997 | Wang | A47D 13/063 403/102 |
| 5,685,660 | A * | 11/1997 | Liao | E05D 11/1007 384/585 |
| 5,692,625 | A * | 12/1997 | Filipescu | A47B 43/00 211/194 |
| 5,746,533 | A * | 5/1998 | Schmidt | E05D 11/1007 16/319 |
| 5,988,928 | A * | 11/1999 | Cheng | A47D 13/063 16/324 |
| 6,113,042 | A * | 9/2000 | Welsch | A47B 57/265 108/110 |
| 6,527,473 | B2 * | 3/2003 | Chen | A47B 87/0207 211/182 |
| 7,083,369 | B2 * | 8/2006 | Nyeboer | B65D 19/12 410/43 |
| 7,204,377 | B2 * | 4/2007 | Marion | F16B 7/0426 211/183 |
| 7,784,613 | B2 * | 8/2010 | Angeletti | B65D 19/44 206/448 |
| 7,802,526 | B2 * | 9/2010 | Brady | B65D 19/12 108/53.5 |
| 7,992,738 | B2 * | 8/2011 | Gao | B65D 19/02 206/505 |
| 8,387,178 | B2 * | 3/2013 | Rivera | A47D 13/063 403/102 |
| 9,474,369 | B1 * | 10/2016 | Tsai | A47B 47/0083 |
| 2004/0238469 | A1 * | 12/2004 | Ng | A47B 43/00 211/149 |
| 2006/0091096 | A1 * | 5/2006 | Velez | B62B 3/002 211/194 |
| 2006/0163438 | A1 * | 7/2006 | Wojotowicz | A47B 87/0215 248/300 |
| 2008/0237168 | A1 * | 10/2008 | Harpole | B65D 19/12 211/195 |
| 2011/0272541 | A1 * | 11/2011 | Wojtowicz | A47B 96/145 248/218.4 |
| 2011/0272542 | A1 * | 11/2011 | Wojtowicz | A47B 87/0215 248/218.4 |
| 2015/0257530 | A1 * | 9/2015 | Naka | A47B 47/0091 211/188 |

* cited by examiner

FOLDABLE POST FOR SHELVING APPARATUS

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a shelf structure, and more particularly to a foldable post for a shelving apparatus, wherein a plurality of post members of a foldable post can be easily assembled to rigidly support a plurality of supporting frames, and can be easily disassembled without detaching the post members.

Description of Related Arts

A conventional shelf structure comprises four vertical posts vertically extended from four corners of the shelf structure and a plurality of supporting panels horizontally and spacedly coupled at the vertical posts to form a shelving unit for supporting objects. As shown in FIG. 1, each vertical post comprises a plurality of tubular post members A1 arranged to align end-to-end. Each of the supporting panels comprises a panel body A2 and four tubular connectors A3 provided at four corners of the panel body A2, wherein the end of the post member A1 is inserted into the tubular connector A3 in order to connect the supporting panel at the vertical post. Accordingly, the configuration of the panel body A2 is fixed such that the size of the panel body A2 cannot be adjusted. In particular, each of the tubular connectors A3 has an upper tapered slot at an upper portion of the tubular connector A3 and a lower tapered slot at a lower portion of the tubular connector A3. Therefore, the end portions of two post members A1 are respectively inserted into the upper and lower tapered slots to securely connect the panel body A2 with the vertical posts while the vertical post are aligned end-to-end. Such tubular detachable connecting structure provides a quick assembling operation to allow the user to set up the shelving unit easily. However, after the objects are loaded and supported by the shelving unit, the overall weight of the objects will exerted to the vertical posts via the supporting panel. In other words, the end portions of two post members A1 are secured at the upper and lower tapered slots of the tubular connector A3, such that the user may require relatively larger pulling force to detach the post members A1 from the tubular connectors A3. In addition, when one of the tubular connectors A3 is broken or damaged, the supporting panels cannot be securely coupled to the vertical posts any more. In fact, in order to enhance the rigidity of the shelving unit, the structure of tubular connectors A3 must be enhanced by using rigid material such a metal or by thickening the walls of the upper and lower tapered slots of the tubular connector A3. Therefore, the material cost of the shelving unit will be substantially high and the size of the shelving unit will be enlarged. Therefore, most users will not use this conventional shelf structure in shopping centers or in the booths because the shelf structure is required to assemble and disassemble and is required to move from places to places.

An improved shelf structure is provided to enhance the storage space by reducing the size of the post connection, wherein the shelf structure comprises four vertical posts each comprising a plurality of L-shaped post members B1 and a plurality of couplers B2 for coupling the post members B1 end-to-end. As shown in FIG. 2, each of the couplers B2 comprises has a corresponding L-shaped coupler flange B21 and two reverse bend flanges B22 extended along two edges of the coupler flange B21, wherein a gap is formed between the reverse bend flange B22 and the coupler flange B21, such that the end portions of two post members B1 are inserted into the gap of the coupler B2 to couple the post members B1 end-to-end. In other words, two post members B1 in an abutting are secured by the coupler B2 by downwardly inserting the end portion of the upper post member B1 into the gap of the coupler B2 and by upwardly inserting the end portion of the lower post member B1 into the gap of the coupler B2. In addition, each of the couplers B2 has a detent B23 on each of the reverse bend flanges B22 to frictionally engage with the post member B1 so as to retain the coupler B2 in position. Since the cross section of the coupler B2 matches with the cross section of the post member B1, the connection between the ends of the post members B1 can be substantially reduced its size. The L-shaped detachable connecting structure provides a quick assembling operation to allow the user to set up the shelving unit easily. However, due to the frictional engagement between the end portion of the post member B1 and the coupler B2, the user may not able to correctly insert the end portion of the post member B1 into the gap of the coupler B2. It is unstable for the shelf structure when the end portion of the post member B1 cannot be fully inserted into the gap of the coupler B2. The excessive inserting force of the end portion of the post member B1 will damage the structure of the coupler B2 and will enlarge the size of the gap thereof. After the shelving unit is set up, the reverse bend flanges B22 are located at the outer surface of post member B1, such that the user may get cut or scratched by the reverse bend flanges B22 when placing the objects. Furthermore, such shaped detachable connecting structure cannot solve the same problem of how to easily disassemble the shelving unit. In other words, after the objects are loaded and supported by the shelving unit, the overall weight of the objects will exerted to the vertical posts via the couplers B2. In other words, the end portions of two post members B1 are secured at the gaps of the couplers B2, such that the user may require relatively larger pulling force to detach the post members B1 from the couplers B2. Once the gap is enlarged by the excessive detaching force, the end portions of the post members B1 cannot be securely engaged with the coupler B2 by means of frictional force. The overall structure of the shelving unit become wobble and unstable. In addition, when one of the couplers B2 is lost or damaged, the post members B1 cannot be coupled end-to-end any more.

SUMMARY OF THE PRESENT INVENTION

The invention is advantageous in that it provides a foldable post for a shelving apparatus, wherein the post members can be easily assembled to rigidly support a plurality of supporting frames, and can be easily disassembled without detaching the post members.

Another advantage of the invention is to provide a foldable post for a shelving apparatus, wherein the post members are pivotally coupled with each other end-to-end to enhance the assembling/disassembling operation of the foldable post.

Another advantage of the invention is to provide a foldable post for a shelving apparatus, wherein the post members are coupled with each other via tongue-and-groove engagement to ensure the rigidity of the foldable post.

Another advantage of the invention is to provide a foldable post for a shelving apparatus, wherein two engaging tongues are extended from the end portions of the upper and lower post members to interlock and couple with each other to ensure the rigidity of the foldable post.

Another advantage of the invention is to provide a foldable post for a shelving apparatus, wherein the post locker is provided for locking up a pivot connection between the post members to ensure the post members to be locked end-to-end.

Another advantage of the invention is to provide a foldable post for a shelving apparatus, which does not require to alter the original structural design of the shelf structure, so as to minimize the manufacturing cost of the shelving apparatus incorporating with the foldable post.

Another advantage of the invention is to provide a foldable post for a shelving apparatus, wherein no expensive or complicated structure is required to employ in the present invention in order to achieve the above mentioned objects. Therefore, the present invention successfully provides an economic and efficient solution for providing a rigid configuration for the foldable post of the shelving apparatus.

Additional advantages and features of the invention will become apparent from the description which follows, and may be realized by means of the instrumentalities and combinations particular point out in the appended claims.

According to the present invention, the foregoing and other objects and advantages are attained by a foldable post for a shelving apparatus, comprising an upper post member, a lower post member, and a post joint for connecting the upper and lower post members end-to-end.

Each of the upper and lower post members having a first post wall and a second post wall extended from the first wall at an angle.

The post joint comprises an engaging tongue extended from an end portion of the first post wall of the upper post member, an engaging groove provided at an end portion of the first post wall of the lower post member, and a pivot hinge pivotally coupled the second post walls of the upper and lower post members, such that when the upper and lower post members are pivotally moved to engage the engaging tongue with the engaging groove, the upper and lower post members are interlocked and coupled with each other end-to-end.

In accordance with another aspect of the invention, the present invention comprises a foldable post for a shelving apparatus, comprising an upper post member, a lower post member, and a post joint for connecting the upper and lower post members end-to-end.

The post joint comprises a first engaging tongue extended from an end portion of the upper post member, a second engaging tongue extended from an end position of the lower post member, and a pivot hinge pivotally coupled the upper and lower post members, such that when the upper and lower post members are pivotally moved to engage the first engaging tongue with the lower post member and to engage the second engaging tongue with the upper post member, the upper and lower post members are interlocked and coupled with each other end-to-end.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
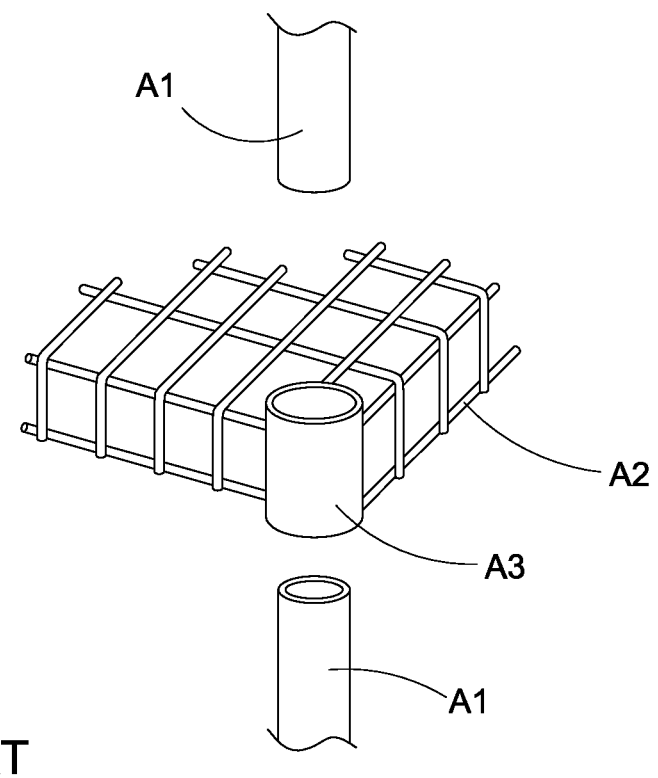
FIG. 1 illustrates a first conventional shelf structure.
Figure 2:
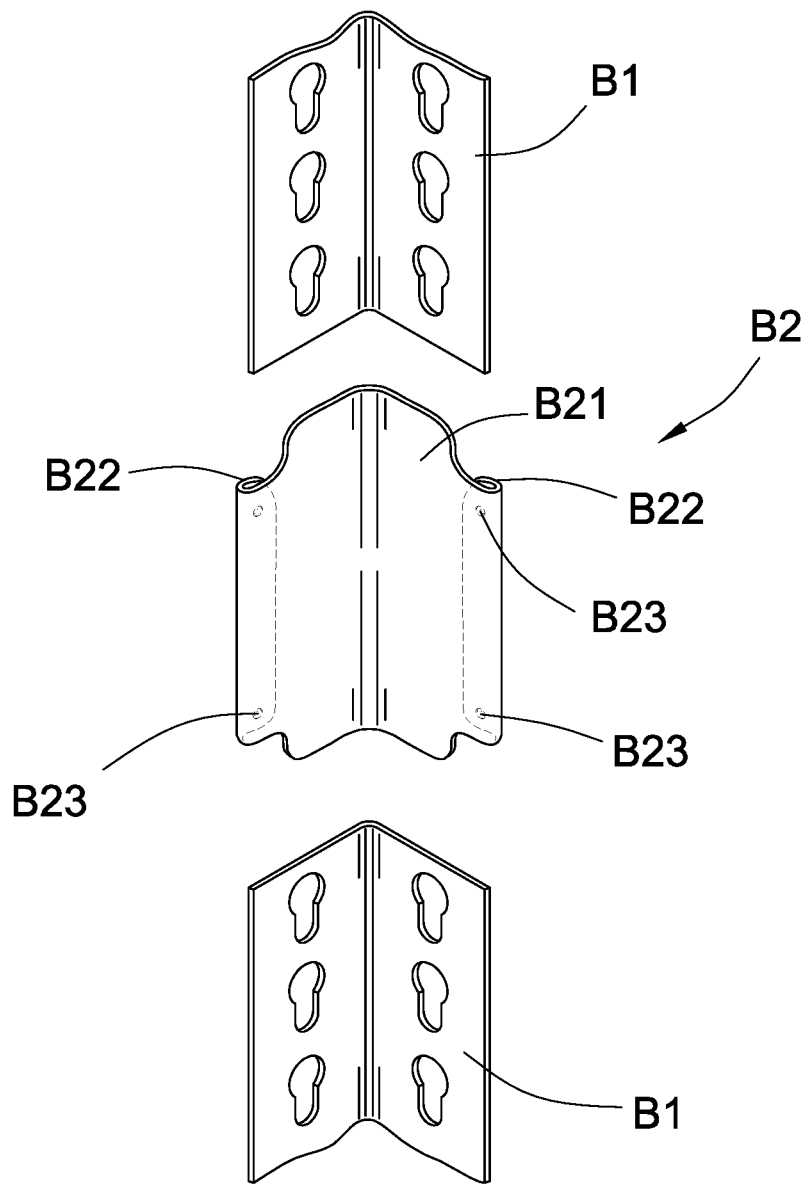
FIG. 2 illustrates a second conventional shelf structure.
Figure 3:
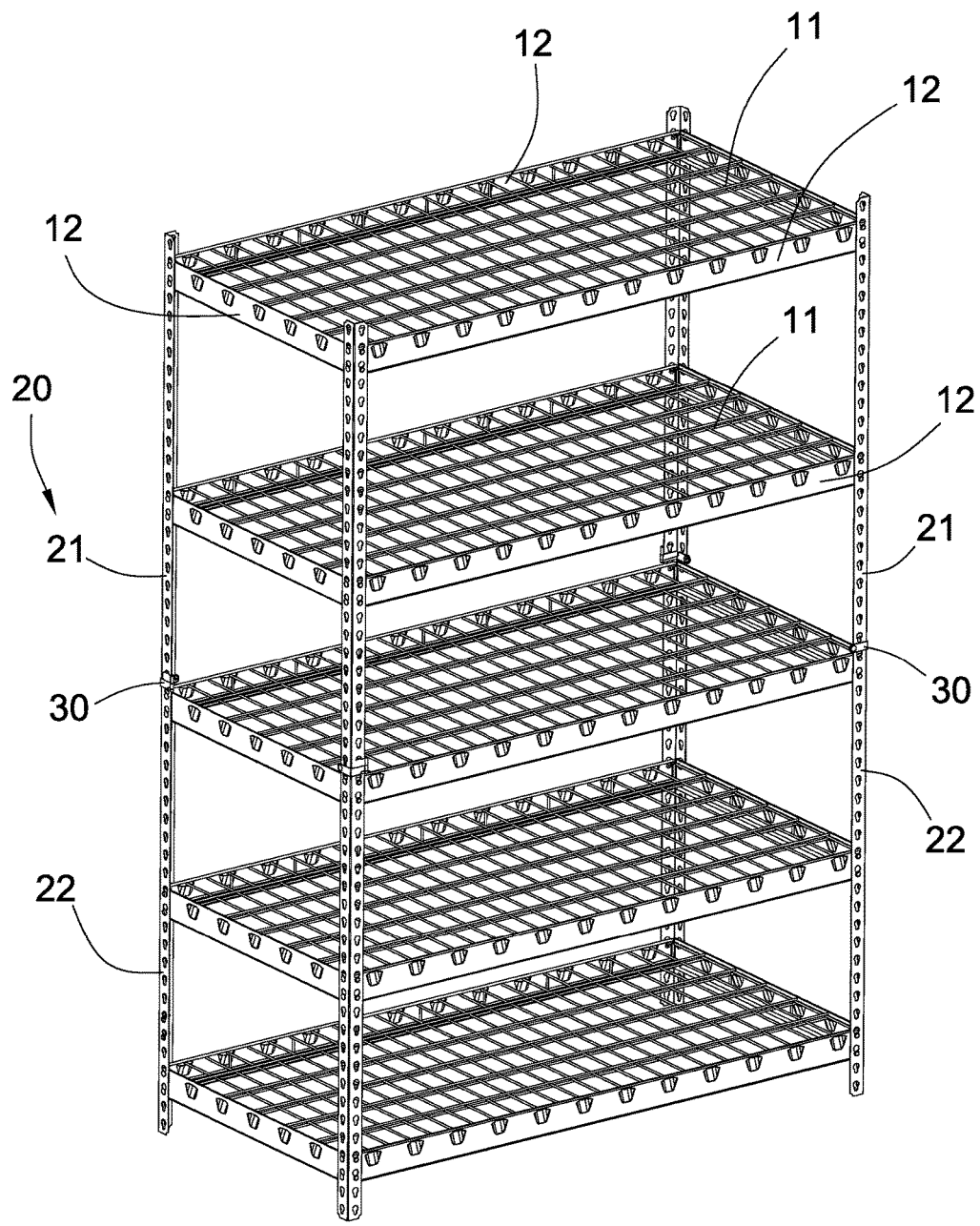
FIG. 3 is a perspective view of a shelving apparatus according to a preferred embodiment of the present invention.
Figure 4:
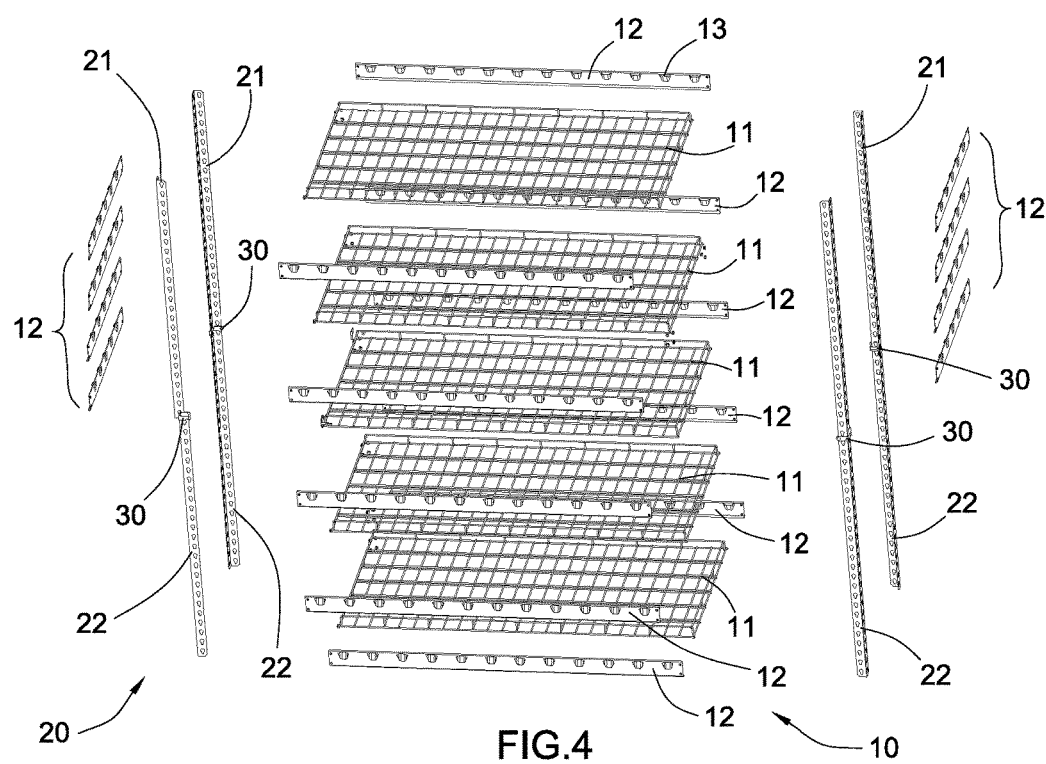
FIG. 4 is an exploded perspective view of the shelving apparatus according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 3 to 7, a shelving apparatus according to a preferred embodiment of the present invention is illustrated, wherein the shelving apparatus comprises a supporting frame 10, a plurality of foldable posts 20 for detachably coupling with the supporting frame 10, and a post joint 30.

According to the preferred embodiment, the supporting frame 10 is supported by the foldable posts 20 in a horizontally oriented manner for supporting one or more objects on the supporting frame 10.

The supporting frame 10 comprises a shelf platform 11 and a plurality of shelf retaining members 12, wherein each of the shelf retaining members 12 is detachably coupled with two of the foldable posts 20, such that the shelf retaining members 12 form a boundary frame to support the shelf platform 11 therewithin. Two of the shelf retaining members 12 serve as a front boundary and a rear boundary respectively, and the other two shelf retaining members 12 serve as two side boundaries respectively, such that the boundary frame is formed by the front boundary, the rear boundary, and the side boundary. Preferably, the length of the front boundary matches with the length of the rear boundary and the side boundaries are identical in length.

Each of the foldable posts 20 is supported in a vertically oriented manner to serve as a corner post of the shelving apparatus. In particular, four foldable posts 20 are provided that four corners of the supporting frame 10 are coupled at the foldable posts 20 respectively. Each of the foldable posts 20 comprises an upper post member 21 and a lower post member 22, wherein each of the upper and lower post members 21, 22 has a first post wall 211, 221 and a second post wall 212, 222 extended from the first wall 211, 221 at an angle. Preferably, the first post walls 211, 221 of the upper and lower post members 21, 22 are perpendicularly extended from the second post walls 212, 222 thereof. In addition, the upper post member 21 is identical to the lower post member 22. it is appreciated that the length of the upper post member 21 can be different from that of the lower post member 22. A width of the first post wall 211, 221 equal to a width of the second post wall 212, 222, such that each of the upper and lower post members 21, 22 has a L-shaped cross section. Each of the foldable posts 20 further has a plurality of keyholes 23 alignedly formed on the first post wall 211, 221 and the second post wall 212, 222 of each of the upper and lower post members 21, 22. Each of the keyholes 23 has an upper hole portion 231 and a lower hole portion 232, wherein a size of the upper hole portion 231 is larger than a size of the lower hole portion 232.

The post joint 30 is arranged for connecting the upper and lower post members 21, 22 end-to-end, such that the upper and lower post members 21, 22 are extended in a vertically oriented manner. Accordingly, the post joint 30 comprises a first means provided at the upper post member 21 and a second means provided at the lower post member 22 to interlock the upper and lower post members 21, 22 with each other. In particular, the post joint 30 comprises an engaging tongue 31 extended from an end portion of the first post wall 211 of the upper post member 21, an engaging groove 32 provided at an end portion of the first post wall 221 of the lower post member 22, and a pivot hinge 33 pivotally coupled the second post walls 212, 222 of the upper and lower post members 21, 22, such that when the upper and lower post members 21, 22 are pivotally moved to engage the engaging tongue 31 with the engaging groove 32, the upper and lower post members 21, 22 are interlocked and coupled with each other end-to-end. In other words, the first and second means are the engaging tongue 31 and the engaging groove 32 to form the interlocking unit to interlock the upper and lower post members 21, 22 with each other.

Figure 5:
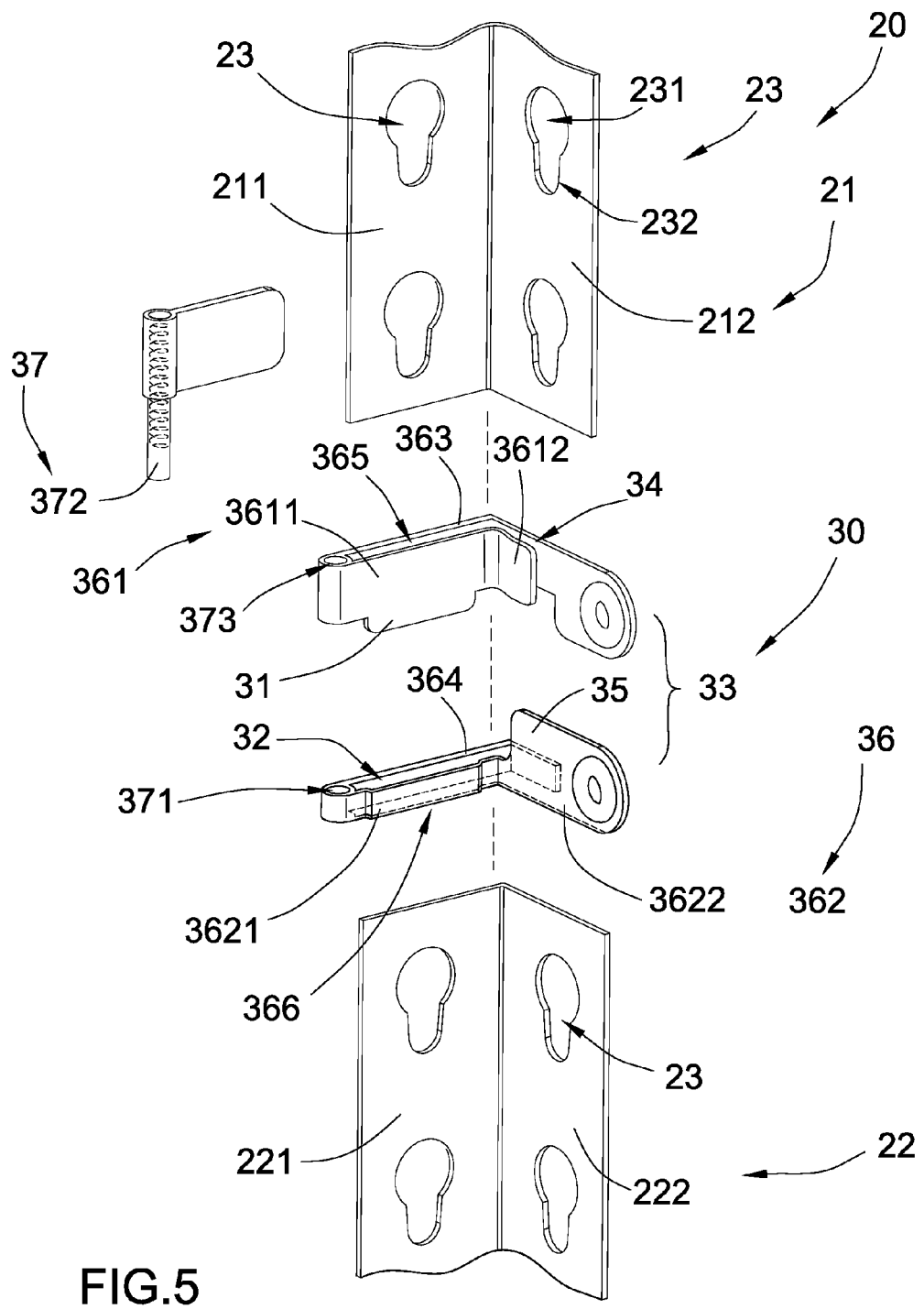
FIG. 5 is an exploded perspective view of a post joint of the shelving apparatus according to the above preferred embodiment of the present invention.
Figure 6:
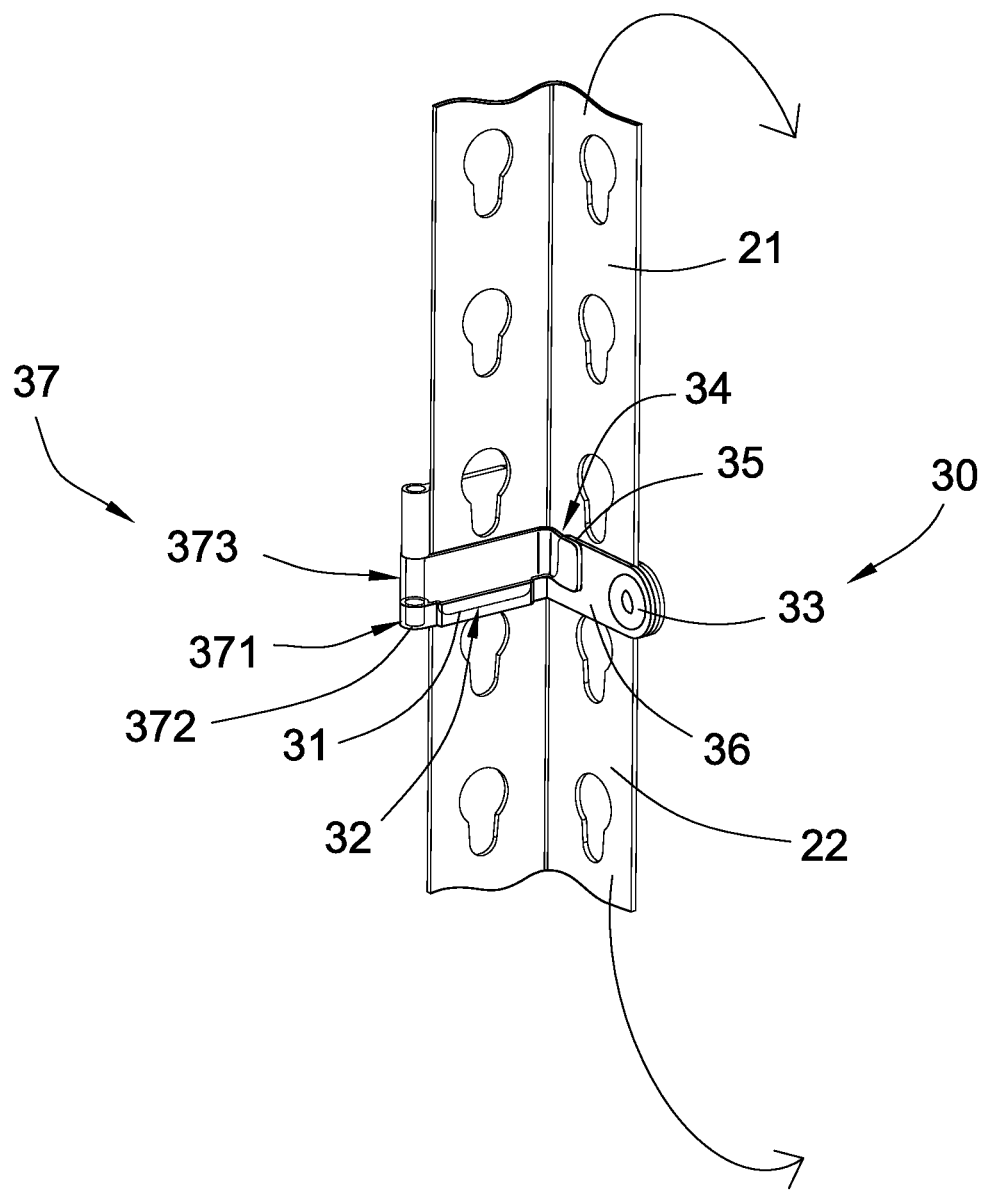
FIG. 6 is a perspective view of the post joint of shelving apparatus according to the above preferred embodiment of the present invention, illustrating the pivotal movement of the post members.

As shown in FIGS. 5 and 6, the post joint 30 further comprises an additional engaging groove 34 extended from an end portion of the second post wall 212 of the upper post member 21 adjacent to the engaging tongue 31 thereof, and an additional engaging tongue 35 provided at an end portion of the second post wall 222 of the lower post member 22 adjacent to the engaging groove 32 thereof.

In other words, the engaging tongue 31 and the additional engaging groove 35 are provided at the first post wall 211 and the second post wall 212 of the upper post member 21 respectively while the engaging groove 32 and the additional engaging tongue 34 are provided at the first post wall 221 and the second post wall 222 of the lower post member 22 respectively. Therefore, when the upper and lower post members 21, 22 are pivotally moved toward each other, the engaging tongue 31 at the first post wall 211 of the upper post member 21 will engage with the engaging groove 32 at the first post wall 221 of the lower post member 22 while the additional engaging tongue 34 at the second post wall 222 of the lower post member 22 will engage with the additional engaging groove 35 at the second post wall 212 of the upper post member 22, so as to interlock the upper and lower post members 21, 22 with each other end-to-end.

Preferably, the engaging tongue 31 is extended from an inner side of the first post wall 211 of the upper post member 21 and the engaging groove 32 is formed at an inner side of the first post wall 221 of the lower post member 22. Likewise, the additional engaging tongue 34 is extended from an inner side of the second post wall 222 of the lower post member 22 and the additional engaging groove 35 is formed at an inner side of the second post wall 212 of the upper post member 21.

As shown in FIGS. 5 and 6, the post joint 30 further comprises two coupling sleeves 36 coupling with the end portions of the upper and lower post members 21, 22 respectively, wherein the pivot hinge 33 is formed between the coupling sleeves 36 to pivotally couple the upper and lower post members 21, 22. Each of the coupling sleeves 36 comprises a first inner sleeve member 361 coupled at the inner side of the upper post member 21 and a second inner sleeve member 362 coupled at the inner side of the lower post member 22. In particular, the first inner sleeve member 361 has two first inner sleeve portions 3611, 3612 coupled at the inner sides of the first and second post walls 211, 212 of the upper post member 21 respectively, wherein one of the first inner sleeve portions 3611 is extended from the end portion of the first post wall 211 of the upper post member 21 to form the engaging tongue 31 while another first inner sleeve portion 3612 is spaced apart from the inner side of the end portion of the second post wall 212 of the upper post member 21 to form the additional engaging groove 35. The second inner sleeve member 362 has two second inner sleeve portions 3621, 3622 coupled at the inner sides of the first and second post walls 221, 222 of the lower post member 22 respectively, wherein one of the second inner sleeve portions 3621 is spaced apart from the inner side of the end portion of the first post wall 221 of the lower post member 21 to form the engaging groove 32 while another second inner sleeve portion 3622 is extended from the end portion of the second post wall 222 of the lower post member 21 to form the additional engaging tongue 34. The pivot hinge 33 is pivotally coupled between two corresponding side edges of the first and second inner sleeve members 361, 362 in order to pivotally couple the upper and lower post members 21, 22 with each other.

According to the preferred embodiment, each of the coupling sleeves 36 further comprises a first outer sleeve member 363 coupled with the first inner sleeve member 361 to define a first sleeve cavity 365 to receive the end portion of the upper post member 21, and a second inner sleeve member 364 coupled with the second inner sleeve member 362 to define a second sleeve cavity 366 to receive the end portion of the lower post member 22. Preferably, the coupling sleeves 36 are securely affixed to the end portions of the upper and lower post members 21, 22 by welding to ensure the secure engagement of the post joint 30 to the upper and lower post members 21, 22.

It is appreciated that at least one of the engaging tongue 31 and the additional engaging groove 35 can be formed at the first outer sleeve member 363 and one of the engaging groove 32 and the additional engaging tongue 34 can be formed at the second outer sleeve member 364. In other words, the post joint 30 provides a tongue-and-groove engagement, especially the interlock tongue-and-groove engagement, to ensure the upper and lower post members 21, 22 with each other end-to-end.

As shown in FIGS. 5 and 6, the post joint 30 further comprises a post locker 37 for releasably locking the upper and lower post members 21, 22 end-to-end. In particular, the post locker 37 is arranged to lock up the pivotal movement between the upper and lower post members 21, 22. Accordingly, the post locker 37 comprises a locking slot 371 provided at the lower post member 22 and a locking latch 372 provided at the upper post member 21, such that when the upper and lower post members 21, 22 are pivotally moved to engage the engaging tongue 31 with the engaging groove 32, i.e. the additional engaging tongue 34 engaged with the additional engaging groove 35 at the same time, the locking latch 372 is actuated to engage with the locking slot 371 to retain the upper and lower post members 21, 22 to be coupled with each other end-to-end. In addition, the post joint 30 further comprises a guiding slot 373 provided at the upper post member 21 to align with the locking slot 371, wherein the locking latch 372 is guided by the guiding slot 373 to slidably actuate to selectively lock up with the locking slot 371. Preferably, the locking latch 372 is a spring-loaded device to push the locking latch 372 to the locking slot 317. In other word, when the locking latch 372 is slidably pulled along the guiding slot 373 until a free end of the locking latch 372 is disengaged with the locking slot 371, the upper and lower post members 21, 22 are capable of being pivotally moved via the pivot hinge 33. Once the upper and lower post members 21, 22 are pivotally moved to engage the engaging tongue 31 with the engaging groove 32, the locking latch 372 is slidably pushed until the free end of the locking latch 372 is engaged with the locking slot 371 to lock up the pivotal movement between the upper and lower post members 21, 22. Accordingly, the guiding slot 373 and the locking slot 371 are formed at the coupling sleeves 36 respectively. In addition, the pivot hinge 33 is formed one side edge of the coupling sleeve 36 and the post locker 37 is formed at an opposed side edge of the coupling sleeve 36.

Figure 7A:
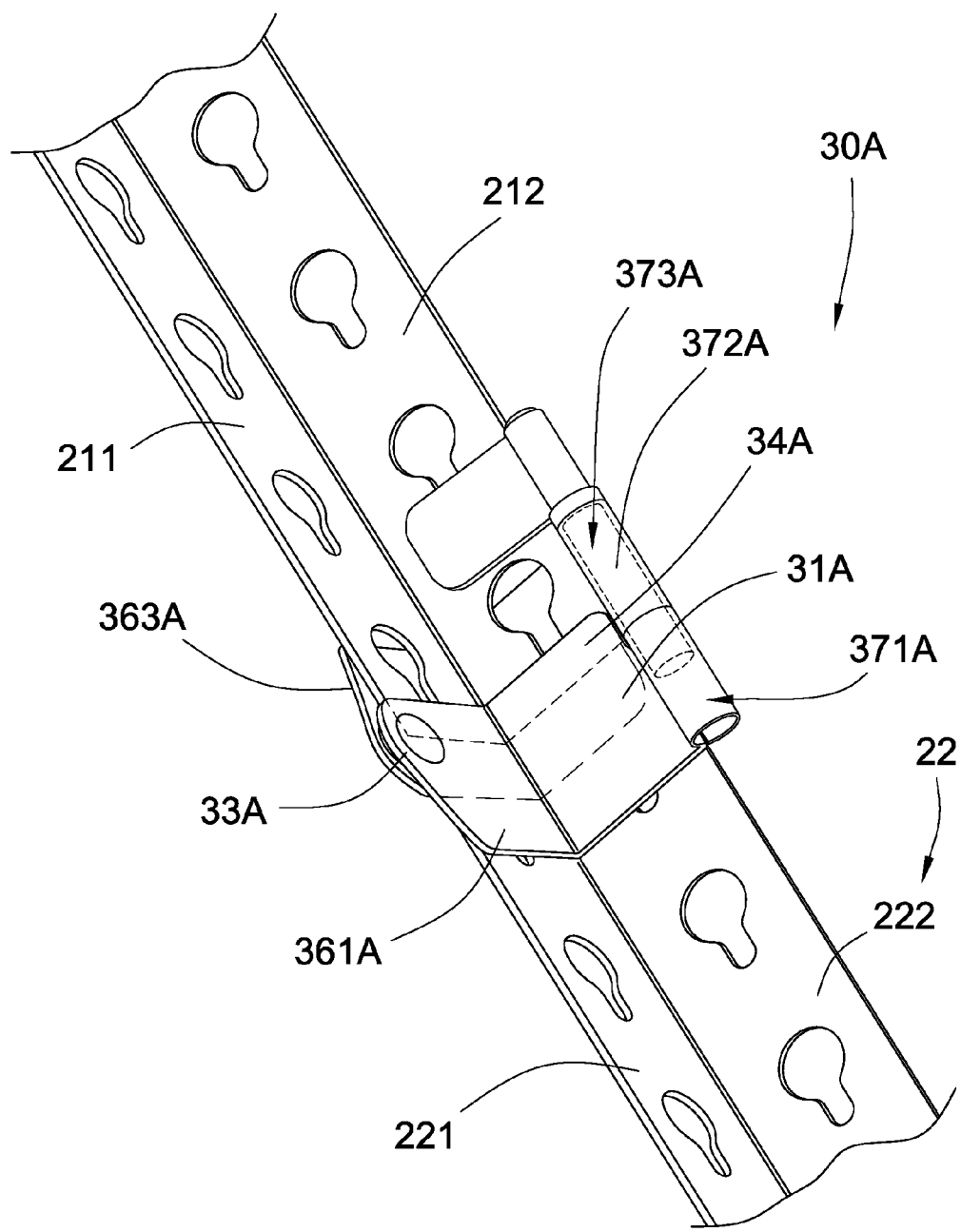
FIGS. 7A and 7B illustrate an alternative mode of the post joint of shelving apparatus according to the above preferred embodiment of the present invention.
Figure 7B:
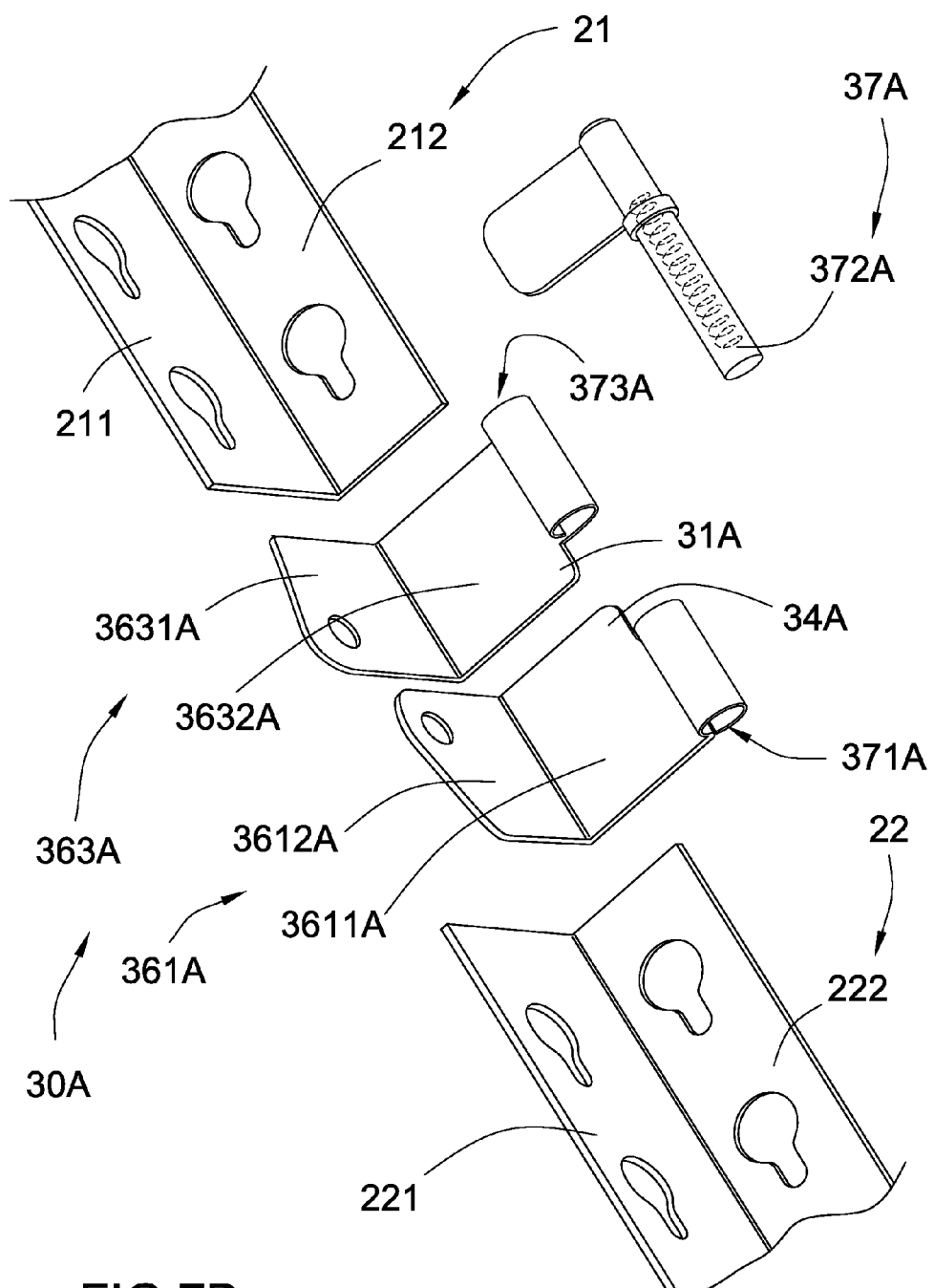

FIGS. 7A and 7B illustrates an alternative mode of the post joint 30A which comprises a first means provided at the upper post member 21 and a second means provided at the lower post member 22 to interlock the upper and lower post members 21, 22 with each other. In particular, the post joint 30A comprises a first engaging tongue 31A extended from the end portion of the upper post member 21, a second engaging tongue 34A extended from the end position of the lower post member 22, and a pivot hinge 33A pivotally coupled the upper and lower post members 21, 22, such that when the upper and lower post members 21, 22 are pivotally moved to engage the first engaging tongue 31A with the lower post member 22 and to engage the second engaging tongue 34A with the upper post member 21, as shown in FIG. 7A, the upper and lower post members 21, 22 are interlocked and coupled with each other end-to-end. The upper and lower post members 21, 22 are pivotally folded via the pivot hinge 33A, as shown in FIG. 7B, the upper and lower post members 21, 22 can be pivotally folded side-by-side. In other words, the first and second means are the first and second engaging tongues 31A, 34A to form the interlocking unit to interlock the upper and lower post members 21, 22 with each other.

Accordingly, the first engaging tongue 31A is extended from one of the first and second post walls 211, 212 of the upper post member 21 and the second engaging tongue 34A is extended from one of the first and second post walls 221, 222 of the lower post member 22. Preferably, the first and second engaging tongue 31A, 34A are extended from the second post walls 212, 222 of the upper and lower post members 21, 22 respectively. In addition, the first engaging tongue 31A is extended from the outer side of the upper post member 21 and the second engaging tongue 34A is extended from the inner side of the lower post member 22, such that when the upper and lower post members 21, 22 are pivotally moved end-to-end, the first engaging tongue 31A is engaged with the outer side of the lower post member 22 while the second engaging tongue 34A is engaged with the inner side of the upper post member 21, so as to interlock the upper and lower post members 21, 22 with each other. It is worth mentioning that the first and second engaging tongues 31A, 34A form a slot therebetween to receive the end portions of the upper and lower post members 21, 22 when the upper and lower post members 21, 22 are pivotally moved end-to-end.

As shown in FIG. 7A, the post joint 30A further comprises two coupling sleeves 36A coupling with the end portions of the upper and lower post members respectively, wherein the pivot hinge 33A is formed between the coupling sleeves 36A to pivotally couple the upper and lower post members 21, 22. Accordingly, one of the coupling sleeves 36A is coupled at the outer side of the upper post member 21, wherein a portion of the coupling sleeve 36A is upwardly extended out of the end portion of the upper post member 21 to form the first engaging tongue 31A. The other coupling sleeve 36A is coupled at the inner side of the lower post member 22, wherein a portion of the coupling sleeve 36A is downwardly extended out of the end portion of the lower post member 22 to form the second engaging tongue 34A.

According to the preferred embodiment, one of the coupling sleeve 36A comprises an outer sleeve 363A coupled at the outer side of the upper post member 21. The outer sleeve 363A has two outer sleeve portions 3631A, 3632A coupled at the outer sides of the first and second post walls 211, 212 of the upper post member 21 respectively. The other coupling sleeve 36A comprises an inner sleeve 361A coupled at the inner side of the lower post member 22. The inner sleeve 361A has two inner sleeve portions 3611A, 3612A coupled at the inner sides of the first and second post walls 221, 222 of the lower post member 21 respectively. Preferably, the coupling sleeves 36A are securely affixed to the end portions of the upper and lower post members 21, 22 by welding to ensure the secure engagement of the post joint 30A to the upper and lower post members 21

The pivot hinge 33A is pivotally coupled one of the outer sleeve portions 3631A with one of the inner sleeve portions 3611A at the edges thereof. In particular, the first and second engaging tongues 31A, 34A are extended from the other outer sleeve portions 3632A and the inner sleeve portion 3612A respectively.

As shown in FIG. 7A, the post joint 30A further comprises a post locker 37A for releasably locking the upper and lower post members 21, 22 end-to-end. In particular, the post locker 37A is arranged to lock up the pivotal movement between the upper and lower post members 21A, 22A. Accordingly, the post locker 37A comprises a locking slot 371A provided at the lower post member 22 and a locking latch 372A provided at the upper post member 21, such that when the upper and lower post members 21, 22 are pivotally moved to interlock with each other via the first and second engaging tongues 31A, 34A, the locking latch 372A is actuated to engage with the locking slot 371A to retain the upper and lower post members 21, 22 to be coupled with each other end-to-end.

In addition, the post joint 30A further comprises a guiding slot 373A provided at the upper post member 21 to align with the locking slot 371A, wherein the locking latch 372A is guided by the guiding slot 373A to slidably actuate to selectively lock up with the locking slot 371A. Preferably, the locking latch 372A is a spring-loaded device to push the locking latch 372A to the locking slot 317A. In other word, when the locking latch 372A is slidably pulled along the guiding slot 373A until a free end of the locking latch 372A is disengaged with the locking slot 371A, the upper and lower post members 21, 22 are capable of being pivotally moved via the pivot hinge 33A. Once the upper and lower post members 21, 22 are pivotally moved to interlock with each other via the first and second engaging tongues 31A, 34A, the locking latch 372A is slidably pushed until the free end of the locking latch 372A is engaged with the locking slot 371A to lock up the pivotal movement between the upper and lower post members 21, 22. Accordingly, the guiding slot 373A and the locking slot 371A are formed at the coupling sleeves 36A respectively. In addition, the pivot hinge 33A is formed one side edge of the coupling sleeve 36A and the post locker 37A is formed at an opposed side edge of the coupling sleeve 36A. It is worth mentioning that the guiding slot 373A and the locking slot 371A are formed at the outer sleeve portions 3632A and the inner sleeve portion 3612A at the edges thereof respectively.

It is worth mentioning that the shelving apparatus of the instant invention can be easily set up by pivotally folding the post members 21, 22 via the post joint 30, 30A end-to-end to form the foldable posts 20 and by coupling the supporting frame 10 to the foldable posts 20 to form a completed shelving unit. Once the post members 21, 22 are pivotally folded end-to-end, the tongue-and-groove engagement or the tongue-and-tongue engagement provided by the post joint 30, 30A will ensure the post members 21, 22 to be coupled with each other end-to-end so as to ensure the rigidity of the foldable post 20.

For disassembling the shelving apparatus of the instant invention, the user is able to easily detach the supporting frame 10 from the foldable posts 20, and is able to pivotally fold the post members 21, 22 side-by-side via the post joint 30, 30A as shown in FIG. 6, to minimize the overall length of each of the foldable posts 20. It is worth mentioning that the post joint 30, 30A is remained attached to two end portions of the post members 21, 22 when the post members 21, 22 are folded side-by-side so as to prevent any misplacement of the component or missing thereof when the shelving apparatus is dissembled.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable post for a shelving apparatus, comprising: upper and lower post members; and
a post joint for connecting said upper and lower post members end-to-end, wherein said post joint comprises a pivot hinge pivotally coupled with said upper and lower post members and an interlock unit that interlocks upper and lower post members with each other end-to-end, such that when said upper and lower post members are pivotally moved end-to-end, said upper and lower post members are interlocked and coupled with each other end-to-end, wherein each of said upper and lower post members has a first post wall and a second post wall extended from said first wall at an angle, wherein a first engaging tongue is extended from one of said first and second post walls of said upper post member and a second engaging tongue is extended from one of said first and second post walls of said lower post member, wherein said interlock unit comprises an engaging tongue extended from an end portion of said first post wall of said upper post member and an engaging groove provided at an end portion of said first post wall of said lower post member, such that when said upper and lower post members are pivotally moved to engage said engaging tongue with said engaging groove, said upper and lower post members are interlocked and coupled with each other end-to-end, wherein said post joint further comprises two coupling sleeves coupling with said end portions of said upper and lower post members respectively, wherein said pivot hinge is formed between said coupling sleeves to pivotally couple said upper and lower post members.

2. The foldable post, as recited in claim 1, further comprising a post locker for releasably locking said upper and lower post members, wherein said post locker comprises a locking slot provided at said lower post member and a locking latch provided at said upper post member, such that when said upper and lower post members are pivotally moved to engage said engaging tongue with said engaging groove, said locking latch is actuated to engage with said locking slot to retain said upper and lower post members to be coupled with each other end-to-end.

3. The foldable post, as recited in 2, wherein said post locker further comprises a guiding slot provided at said upper post member to align with said locking slot, wherein said locking latch is guided to slide at said guiding slot to selectively lock up with said locking slot.

4. A foldable post for a shelving apparatus, comprising: upper and lower post members; and
a post joint for connecting said upper and lower post members end-to-end, wherein said post joint comprises a pivot hinge pivotally coupled with said upper and lower post members and an interlock unit that interlocks upper and lower post members with each other end-to-end, such that when said upper and lower post members are pivotally moved end-to-end, said upper and lower post members are interlocked and coupled with each other end-to-end, wherein each of said upper and lower post members has a first post wall and a second post wall extended from said first wall at an angle, wherein a first engaging tongue is extended from one of said first and second post walls of said upper post member and a second engaging tongue is extended from one of said first and second post walls of said lower post member, wherein said interlock unit comprises an engaging tongue extended from an end portion of said first post wall of said upper post member and an engaging groove provided at an end portion of said first post wall of said lower post member, such that when said upper and lower post members are pivotally moved to engage said engaging tongue with said engaging groove, said upper and lower post members are interlocked and coupled with each other end-to-end, wherein said post joint further comprises an additional engaging groove extended from an end portion of said second post wall of said upper post member adjacent to said engaging tongue thereof, and an additional engaging tongue provided at an end portion of said second post wall of said lower post member adjacent to said engaging groove thereof, such that when said upper and lower post members are pivotally moved to engage said additional engaging tongue with said additional engaging groove, said upper and lower post members are coupled with each other end-to-end, wherein said post joint further comprises a first coupling sleeve and a second coupling sleeve coupling with said end portions of said upper and lower post members respectively, wherein said pivot hinge is formed between said first and second coupling sleeves to pivotally couple said upper and lower post members.

5. The foldable post, as recited in claim 4, further comprising a post locker for releasably locking said upper and lower post members, wherein said post locker comprises a locking slot provided at said lower post member and a locking latch provided at said upper post member, such that when said upper and lower post members are pivotally moved to engage said engaging tongue with said engaging groove, said locking latch is actuated to engage with said locking slot to retain said upper and lower post members to be coupled with each other end-to-end.

6. The foldable post, as recited in claim 5, wherein said post locker further comprises a guiding slot provided at said upper post member to align with said locking slot, wherein said locking latch is guided to slide at said guiding slot to selectively lock up with said locking slot.

7. The foldable post, as recited in claim 6, wherein said guiding slot and said locking slot are formed at said coupling sleeves respectively.

8. The foldable post, as recited in claim 6, wherein said pivot hinge is formed on a side edge of said first coupling sleeve and said post locker is formed at an opposed side edge of said second coupling sleeve.

9. A foldable post for a shelving apparatus, comprising: upper and lower post members; and
a post joint for connecting said upper and lower post members end-to-end, wherein said post joint comprises a pivot hinge pivotally coupled with said upper and lower post members and an interlock unit that interlocks upper and lower post members with each other end-to-end, such that when said upper and lower post members are pivotally moved end-to-end, said upper and lower post members are interlocked and coupled with each other end-to-end, wherein said interlock unit comprises a first engaging tongue extended from an end portion of said upper post member and a second engaging tongue extended from an end position of said lower post member, such that when said upper and lower post members are pivotally moved to engage said first engaging tongue with said lower post member and to engage said second engaging tongue with said upper post member, said upper and lower post members are interlocked and coupled with each other end-to-end, wherein said post joint further comprises two coupling sleeves coupling with said end portions of said upper and lower post members respectively, wherein said pivot hinge is formed between said coupling sleeves to pivotally couple said upper and lower post members.

10. A foldable post for a shelving apparatus, comprising: upper and lower post members; and
a post joint for connecting said upper and lower post members end-to-end, wherein said post joint comprises a pivot hinge pivotally coupled with said upper and lower post members and an interlock unit that interlocks upper and lower post members with each other end-to-end, such that when said upper and lower post members are pivotally moved end-to-end, said upper and lower post members are interlocked and coupled with each other end-to-end, wherein said interlock unit comprises a first engaging tongue extended from an end portion of said upper post member and a second engaging tongue extended from an end position of said lower post member, such that when said upper and lower post members are pivotally moved to engage said first engaging tongue with said lower post member and to engage said second engaging tongue with said upper post member, said upper and lower post members are interlocked and coupled with each other end-to-end, wherein each of said upper and lower post members has a first post wall and a second post wall extended from said first wall at an angle, wherein said first engaging tongue is extended from one of said first and second post walls of said upper post member and said second engaging tongue is extended from one of said first and second post walls of said lower post member, wherein said post joint further comprises two coupling sleeves coupling with said end portions of said upper and lower post members respectively, wherein said pivot hinge is formed between said coupling sleeves to pivotally couple said upper and lower post members.

11. The foldable post, as recited in claim 9, further comprising a post locker for releasably locking said upper and lower post members, wherein said post locker comprises a locking slot provided at said lower post member and a locking latch provided at said upper post member, such that when said upper and lower post members are pivotally moved to interlock with each other via said first and second engaging tongues, said locking latch is actuated to engage with said locking slot to retain said upper and lower post members to be coupled with each other end-to-end.

12. The foldable post, as recited in claim 10, further comprising a post locker for releasably locking said upper and lower post members, wherein said post locker comprises a locking slot provided at said lower post member and a locking latch provided at said upper post member, such that when said upper and lower post members are pivotally moved to interlock with each other via said first and second engaging tongues, said locking latch is actuated to engage with said locking slot to retain said upper and lower post members to be coupled with each other end-to-end.

13. The foldable post, as recited in claim 11, wherein said post locker further comprises a guiding slot provided at said upper post member to align with said locking slot, wherein said locking latch is guided to slide at said guiding slot to selectively lock up with said locking slot.

14. The foldable post, as recited in claim 12, wherein said post locker further comprises a guiding slot provided at said upper post member to align with said locking slot, wherein said locking latch is guided to slide at said guiding slot to selectively lock up with said locking slot.

15. The foldable post, as recited in claim 13, wherein said guiding slot and said locking slot are formed at said coupling sleeves respectively.

16. The foldable post, as recited in claim 14, wherein said guiding slot and said locking slot are formed said two coupling sleeves respectively.

17. The foldable post, as recited in claim 13, wherein said pivot hinge is formed one side edge of said first coupling sleeve and said post locker is formed at an opposed side edge of said second coupling sleeve.

18. The foldable post, as recited in claim 16, wherein said pivot hinge is formed one side edge of said first coupling sleeve and said post locker is formed at an opposed side edge of said second coupling sleeve.

* * * * *